(12) United States Patent
Dukes et al.

(10) Patent No.: US 9,489,135 B2
(45) Date of Patent: *Nov. 8, 2016

(54) SYSTEMS AND METHODS FOR HIGHLY SCALABLE SYSTEM LOG ANALYSIS, DEDUPLICATION AND MANAGEMENT

(71) Applicant: Logzilla Corporation, Austin, TX (US)

(72) Inventors: Clayton Brandon Dukes, Morrisville, NC (US); Piotr Piatkowski, Lapczyca (PL)

(73) Assignee: LOGZILLA CORPORATION, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,762

(22) Filed: Jul. 17, 2015

(65) Prior Publication Data

US 2016/0085452 A1    Mar. 24, 2016

Related U.S. Application Data

(63) Continuation of application No. 14/524,625, filed on Oct. 27, 2014, now Pat. No. 9,122,694.

(60) Provisional application No. 62/054,572, filed on Sep. 24, 2014.

(51) Int. Cl.

| G06F 7/00   | (2006.01) |
|-------------|-----------|
| G06F 3/06   | (2006.01) |
| G06F 17/30  | (2006.01) |
| G06F 11/14  | (2006.01) |
| G06F 17/27  | (2006.01) |

(52) U.S. Cl.
CPC ........... *G06F 3/0608* (2013.01); *G06F 3/0641* (2013.01); *G06F 3/0683* (2013.01); *G06F 11/1435* (2013.01); *G06F 17/2705* (2013.01); *G06F 17/30156* (2013.01); *G06F 17/30303* (2013.01); *G06F 17/30336* (2013.01); *G06F 17/30371* (2013.01); *G06F 17/30377* (2013.01); *G06F 17/30412* (2013.01)

(58) Field of Classification Search
CPC .............................................. G06F 17/30156
USPC ....................................... 707/672, 692, 698
See application file for complete search history.

(56) References Cited

U.S. PATENT DOCUMENTS

| 5,455,947 | A   | 10/1995 | Suzuki et al.   |                |
|-----------|-----|---------|-----------------|----------------|
| 6,502,133 | B1  | 12/2002 | Baulier et al.  |                |
| 6,690,274 | B1  | 2/2004  | Bristol         |                |
| 6,836,894 | B1  | 12/2004 | Hellerstein et al. |             |
| 7,409,357 | B2  | 8/2008  | Schaf et al.    |                |
| 7,584,338 | B1* | 9/2009  | Bricker         | G06F 17/30212  |
|           |     |         |                 | 707/999.202    |
| 7,634,812 | B2  | 12/2009 | Costa et al.    |                |

(Continued)

OTHER PUBLICATIONS

Co-pending U.S. Appl. No. 14/524,625, filed Oct. 27, 2014.

(Continued)

*Primary Examiner* — Cheyne D Ly
(74) *Attorney, Agent, or Firm* — Wilson, Sonsini, Goodrich & Rosati

(57) ABSTRACT

Systems and methods for parsing raw log data into structured log data, and removing duplicate entries, storing the deduplicated log data into binary format, and managing system events. The subject matter can increase speed of log data analysis and storage, reduce data storage for log data, and manage easily system events.

10 Claims, 11 Drawing Sheets

(56) References Cited

U.S. PATENT DOCUMENTS

| | | |
|---|---|---|
| 7,634,813 B2 | 12/2009 | Costa et al. |
| 7,930,746 B1 | 4/2011 | Sheleheda et al. |
| 8,069,374 B2 | 11/2011 | Panigrahy et al. |
| 8,112,425 B2 | 2/2012 | Baum et al. |
| 2006/0085361 A1 | 4/2006 | Hoerle et al. |
| 2006/0112175 A1 | 5/2006 | Sellers et al. |
| 2009/0177857 A1 | 7/2009 | Butterworth et al. |
| 2009/0271448 A1 | 10/2009 | Chen et al. |
| 2010/0082547 A1 | 4/2010 | Mace et al. |
| 2011/0185234 A1 | 7/2011 | Cohen et al. |
| 2011/0296237 A1 | 12/2011 | Mandagere et al. |
| 2011/0314148 A1 | 12/2011 | Petersen et al. |
| 2013/0024722 A1 | 1/2013 | Kotagiri et al. |
| 2014/0208168 A1 | 7/2014 | Yakote et al. |
| 2016/0085792 A1 | 3/2016 | Dukes et al. |

OTHER PUBLICATIONS

Co-pending U.S. Appl. No. 14/524,658, filed Oct. 27, 2014.
Jayathilake. Towards Structured Log Analysis, 2012 Ninth International Joint Conference on Computer Science and Software Engineering (JCSSE). pp. 259-264 (2012).
Stearley et al. Bridging the Gaps: Joining Information Sources with Splunk. Workshop on Managing Systems via Log Analysis and Machine Learning Techniques (SLAML). pp. 1-7 (2010).
U.S. Appl. No. 14/524,625 Office Action dated Jan. 29, 2015.
U.S. Appl. No. 14/524,658 Office Action dated Mar. 11, 2015.

* cited by examiner

SYSTEMS AND METHODS FOR HIGHLY SCALABLE SYSTEM LOG ANALYSIS, DEDUPLICATION AND MANAGEMENT

CROSS-REFERENCE TO RELATED APPLICATIONS

This application claims priority to U.S. application Ser. No. 14/524,625, filed Oct. 27, 2014, which issued as U.S. Pat. No. 9,122,694 on Sep. 1, 2015, and the benefit of U.S. Application Ser. No. 62/054,572, filed Sep. 24, 2014, which are hereby incorporated by reference in their entirety.

BACKGROUND OF THE INVENTION

Log data recorded by a system (e.g., a server, a gateway device, a network router, a firewall, etc.) are footprints of system and/or network activities. When the system experiences an anomaly, which may be due to various reasons (e.g., attacks, virus, phishing, electricity outage, etc.), a system administrator typically relies on the system log data to identify problems in order to carry out a solution. However, in the modern computing infrastructure which includes a tremendous number of computing devices, more system and network activities take place, leading to more log data being recorded.

SUMMARY OF THE INVENTION

A large number of recorded log data occupies a large volume of data storage; in some cases, a gigantic amount of log data is the reason inducing system failure. Moreover, the raw log data are unstructured log data, which prohibits systematic management of system/network events. When a system outage happens, the more log data, the more difficult the outage can be solved and the more time the system administrator must spend to discover the true source of the outage. It has been estimated that the loss due to system downtime can reach as high as 5 million dollars per hour, for example, in the financial industry. A new way to record log data occupying a smaller volume of data storage is an urgent task. An easy way for system administrators to monitor, analyze and manage log data is a must.

The subject matter disclosed herein includes a new system, a new method, and/or new media to record system log data. Furthermore, the subject matter comprises a novel analysis paradigm to assist log data monitoring and management. The system described herein can save a large amount of data storage and can scale up the log data management to virtually infinite servers. In addition, the system/method/media disclosed herein will assist system administrators in identifying anomalies in a short amount of time.

In one aspect, disclosed herein is a computer-implemented system for log data analysis and deduplication, the system comprising: (a) one or more digital processing devices comprising an operating system configured to perform executable instructions; (b) one or more data storages storing one or more binary files; (c) a computer program including instructions executable by the one or more digital processing devices to create an application, the application comprising: (1) a parser module configured to: receive raw log data, and transform the raw log data into structured log data, the transformation comprising: processing the raw log data by a hash function, deriving one or more system event identifiers from one or more data fields of the raw log data, and generating the structured log data in a binary format; and (2) a storage module without a database service configured to: (i) receive the structured log data within a time window; (ii) identify duplicated data entries in the structured log data, wherein the duplicated data entries are associated with a same system event identifier; (iii) create a representative of the duplicated data entries; (iv) count a number of occurrences in the duplicated data entries; (v) retain timestamps of the duplicated data entries; (vi) generate a serialized data record and store the serialized data record into the one or more binary files, wherein the serialized data record comprises: the timestamps, the representative, and the number of the occurrences; and (vii) retrieve the serialized data record from the one or more binary files. In some embodiments, the one or more data storages comprise one or more memory devices, and/or one or more hard drives.

In another aspect, disclosed herein is a computer-implemented system for log data analysis and deduplication, the system comprising: (a) one or more digital processing devices comprising an operating system configured to perform executable instructions; (b) one or more data storages storing one or more binary files; (c) a computer program including instructions executable by the one or more digital processing devices to create an application, the application comprising: (1) a parser module configured to: receive raw log data, and transform the raw log data into structured log data; and (2) a storage module without a database service configured to: (i) identify duplicated data entries in the structured log data; and (ii) generate a serialized data record and store the serialized data record into the one or more binary files, wherein the serialized data record comprises one or more timestamps of the duplicated data entries and a single representative of the duplicated data entries.

In another aspect, disclosed herein are non-transitory computer-readable storage media encoded with a computer program including instructions executable by a processor to create an application for log data analysis and deduplication, the application comprising: (a) a parser module configured to: receive raw log data, and transform the raw log data into structured log data; and (b) a storage module without a database service configured to: (1) identify duplicated data entries in the structured log data; and (2) generate a serialized data record and store the serialized data record into one or more binary files, wherein the serialized data record comprises one or more timestamps of the duplicated data entries and a single representative of the duplicated data entries. The application is implemented as software as a service.

In another aspect, disclosed herein are non-transitory computer-readable storage media encoded with a computer program including instructions executable by a processor to create an application for log data analysis and deduplication, the application comprising: (a) a user interface allowing a user to configure one or more parser modules or a plurality of storage modules; (b) the one or more parser modules configured to: (1) receive raw log data, (2) transform the raw log data into structured log data, and (3) transmit the structured log data to a plurality of storage modules, wherein data entries of the structured log data associated with a same system event are transmitted to a same storage module; and (c) the plurality of storage modules without a database service, the storage modules configured to: (1) receive the structured log data from the one or more parser modules; (2) identify duplicated data entries in the structured log data; (3) generate a representative of the duplicated data entries; (4) generate a serialized data record, the serialized data record comprising timestamps of the duplicated data entries and the representative of the duplicated data entries; and (5) store the serialized data record in a binary file. In some embodiments, the storage modules are distributed to one or more servers. The number of storage modules is more than 1, 10, 100, 1000, or 100000.

In some embodiments, the one or more data storages comprise one or more memory devices, and/or one or more hard drives. In some embodiments, the structured log data is in a binary form. In some embodiments, the structured log data comprises one or more system event identifiers, and/or timestamps. Non-limiting examples of system events include: a network event, an actionable network event, a hack, a data breach, a system failure, a network failure, a user activity, a phishing activity, a spam, an advertisement, a fake message, a hack, an attack, an intrusion, a malicious activity, an unnatural activity, and a virus. In one embodiment, a system event is represented by a data entry comprising one or more bytes.

In some embodiments, the one or more system event identifiers comprise an alphanumeric representation of a system event, and/or one or more checksums. In some embodiments, the one or more system event identifiers are stored in the one or more data storages, and/or in the one or more memory devices. In certain embodiments, the one or more system event identifiers are derived within the time window. In additional embodiments, the one or more system event identifiers are accessible by the storage module within the time window, and/or are inaccessible by the storage module when a time lapses the time window.

In some embodiments, the parser module is further configured to transmit the structured log data to the parser module through a push. The transforming the raw log data into the structured log data comprises one or more of the following: processing the raw log data by a hash function; deriving one or more system event identifiers from one or more data fields of the raw log data; and generating the structured log data.

In some embodiments, the duplicated data entries are associated with a same system event identifier in the structured log data. In some embodiments, the storage module is further configured to perform one or more of the following: count a number of occurrences in the duplicated data entries; retain timestamps of the duplicated data entries; retrieve the serialized data record from the one or more binary files. In certain embodiments, the storage module further comprises an object identifier, the object identifier comprising an identifier of a binary file and a virtual offset. In further embodiments, the object identifier comprises 2 bytes, and/or the virtual offset comprises 6 bytes.

In some embodiments, the storage module further comprises an online analytical processing tool configured to aggregate a data field in the one or more binary files. Non-limiting examples of the data field include: a timestamp, a number of occurrences of a host server, a number of occurrences of a program, a number of occurrences of a severity level, a number of occurrences of a system event, a list of a last active host server, a summary of system events within a time window. In some embodiments, a timestamp comprises 8 bytes.

In some embodiments, the application further comprises a mapping module configured to create, record, modify or delete a map between one or more system event identifiers and the storage module. In further embodiments, the mapping module maps one or more system events associated with a same system event identifier to a same storage module. I In one embodiment, the application further comprises a detection module configured to detect a system event from one or more of the following: the structured log data, and the one or more binary files. In additional embodiments, the detection module generates an alert when a system event meets one or more alert rules.

In some embodiments, the application further comprises a query module configured to interact with a user to enter, adjust or retrieve one or more data parameters. The one or more data parameters comprise one or more data fields or data tokens extracted from the raw log data. Non-limiting examples of the one or more data parameters include: a number of occurrence of hosts, a number of occurrence of programs, a number of occurrence of system events, a level of severity, a list of active hosts, a list of last active hosts, and a time period for the storage module receiving the structured log data.

In some embodiments, the application further comprises a full text search indexer configured to: index the serialized data records stored in the one or more binary files; and allow searching or filtering on the serialized data records. In one of the embodiment, the full text search indexer comprises an index list. Configuration of the index list may be automatic or dynamic.

In some embodiments, the application further comprises a manager module configured to configure the parser module or the storage module. In certain embodiments, the configuring parser module and/or the storage module is achieved remotely or locally. The configuring the parser module or the storage module is achieved in a distributive way. In one of the embodiments, the manager module further comprises a user interface, the interface allowing a user to enter or modify one or more configuration parameters for the parser module or the storage module; and/or receive one or more existing configuration parameters of the parser module or the storage module. In additional embodiments, the manager module configures the parser module and/or the storage module on a regular basis, and/or on an irregular basis. In some embodiments, the manager module configures the parser module and/or the storage module by transmitting one or more configuration parameters to the parser module and/or the storage module. In certain scenarios, the manager module further comprises a storage storing one or more configuration parameters of the parser module or the storage module. In some systems, the manager module further comprises a networking map of the parser module or the storage module.

In some embodiments, all of the manager module, the parser module and the storage module are installed on a same digital processing device. Alternatively, the manager module, the parser module and the storage module are installed on a same digital processing device. Other possible embodiments are that the manager module, the parser module and the storage module are installed on distinct digital processing devices. In certain embodiments, the manager module is installed on one or more digital processing devices. In some implementations, the parser module is installed on one or more digital processing devices. In several embodiments, the storage module is installed on one or more digital processing devices.

DETAILED DESCRIPTION OF THE INVENTION

Figure 1:
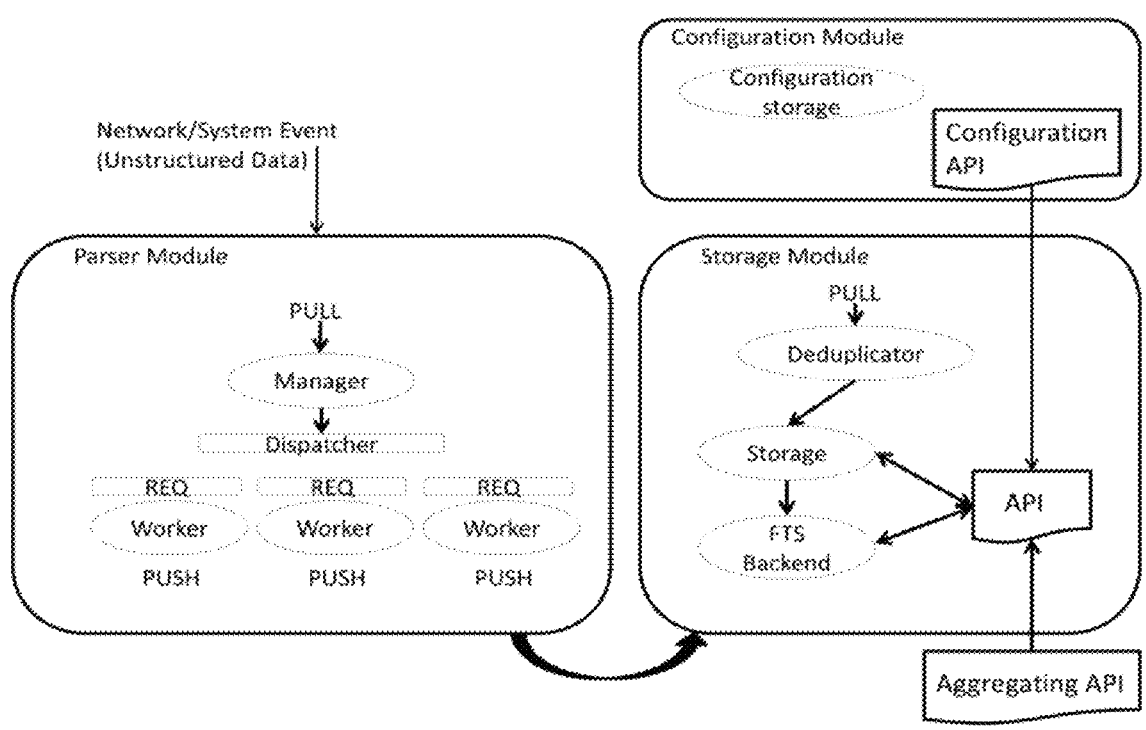
FIG. 1 illustrates an example of a system design; in this case, the parser module received unstructured/raw log data and transformed the raw log data into structured log data, which was pushed to the storage module for deduplication.

A drawback of existing schemes of log data handling is that a large number of recorded log data occupies a large volume of data storage. The drawback may further induce system failures. Another problem is that the raw log data are unstructured log data, which prohibits systematic management of system/network events. Furthermore, it has been frequently seen that an unusual activity takes places in a number of trials during a small time window. For example, a computing system may repeatedly attempt to access a same hard drive which is out of order. In a phishing activity, a hacker attempts to access sensitive information with a large number of trials during few seconds, minutes, or hours.

Due to various reasons ranging from power blackout to network attacks, a system outage happens from time to time; the more log data, the more difficult the outage can be solved and the more time the system administrator must spend to discover the true source of the outage, which could be failure of an uninterruptible power supply or a network attack. Financial loss due to system downtime can reach as high as 5 million dollars per hour in various industries. A more catastrophic scenario is data breach or security outbreak. In the worst cases, the system outage may sacrifice human lives. The faster the system administrator can find the actual problem and carry out efficiently an effective solution, a smaller loss will incur. Therefore, a new computing infrastructure able to handle a tremendous amount of log data is necessary. A new way to record log data occupying a smaller volume of data storage is an urgent task. An easy way for system administrators to monitor, analyze and manage log data is a must.

The subject matter disclosed herein includes a new system, a new method, and/or new media to record system log data. Furthermore, the subject matter comprises a novel analysis paradigm to assist log data monitoring and management. In particular, when there is an unusual activity which takes place a number of times during a time window, the system can analyze the log data, reduce the storage size required to store the log data, detect the abnormality, and alert the system administrator. The system described herein can save a large amount of data storage and can scale up the log data management to virtually infinite servers. In addition, the system/method/media disclosed herein will assist system administrators identify system outage in a short amount of time. The benefits include, but not limited to: lower cost of computing infrastructure, lower cost of data storage, high speed of log data storing, generation of structured log data from raw log data, removal of duplicated information in the raw log data, smaller amount of required data storage, efficient management of log data, less system outages, faster problem solving during system outages, and less financial loss.

In certain embodiments, described herein includes a computer-implemented system for log data analysis and deduplication, the system comprising: (a) one or more digital processing devices comprising an operating system configured to perform executable instructions; (b) one or more data storages storing one or more binary files; (c) a computer program including instructions executable by the one or more digital processing devices to create an application, the application comprising: (1) a parser module configured to: receive raw log data, and transform the raw log data into structured log data, the transformation comprising: processing the raw log data by a hash function, deriving one or more system event identifiers from one or more data fields of the raw log data, and generating the structured log data in a binary format; and (2) a storage module without a database service configured to: (i) receive the structured log data within a time window; (ii) identify duplicated data entries in the structured log data, wherein the duplicated data entries are associated with a same system event identifier; (iii) create a representative of the duplicated data entries; (iv) count a number of occurrences in the duplicated data entries; (v) retain timestamps of the duplicated data entries; (vi) generate a serialized data record and store the serialized data record into the one or more binary files, wherein the serialized data record comprises: the timestamps, the representative, and the number of the occurrences; and (vii) retrieve the serialized data record from the one or more binary files. In some embodiments, the one or more data storages comprise one or more memory devices, and/or one or more hard drives.

In certain embodiments, described herein includes a computer-implemented system for log data analysis and deduplication, the system comprising: (a) one or more digital processing devices comprising an operating system configured to perform executable instructions; (b) one or more data storages storing one or more binary files; (c) a computer program including instructions executable by the one or more digital processing devices to create an application, the application comprising: (1) a parser module configured to: receive raw log data, and transform the raw log data into structured log data; and (2) a storage module without a database service configured to: (i) identify duplicated data entries in the structured log data; and (ii) generate a serialized data record and store the serialized data record into the one or more binary files, wherein the serialized data record comprises one or more timestamps of the duplicated data entries and a single representative of the duplicated data entries.

In certain embodiments, described herein includes are non-transitory computer-readable storage media encoded with a computer program including instructions executable by a processor to create an application for log data analysis and deduplication, the application comprising: (a) a parser module configured to: receive raw log data, and transform the raw log data into structured log data; and (b) a storage module without a database service configured to: (1) identify duplicated data entries in the structured log data; and (2) generate a serialized data record and store the serialized data record into one or more binary files, wherein the serialized data record comprises one or more timestamps of the duplicated data entries and a single representative of the duplicated data entries.

In certain embodiments, described herein includes non-transitory computer-readable storage media encoded with a computer program including instructions executable by a processor to create an application for log data analysis and deduplication, the application comprising: (a) a user interface allowing a user to configure one or more parser modules or a plurality of storage modules; (b) the one or more parser modules configured to: (1) receive raw log data, (2) transform the raw log data into structured log data, and (3) transmit the structured log data to a plurality of storage modules, wherein data entries of the structured log data associated with a same system event are transmitted to a same storage module; and (c) the plurality of storage modules without a database service, the storage modules configured to: (1) receive the structured log data from the one or more parser modules; (2) identify duplicated data entries in the structured log data; (3) generate a representative of the duplicated data entries; (4) generate a serialized data record, the serialized data record comprising timestamps of the duplicated data entries and the representative of the duplicated data entries; and (5) store the serialized data record in a binary file. In some embodiments, the storage modules are distributed to one or more servers. The number of storage modules is more than 1, 10, 100, 1000, or 100000.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Raw Log Data

In some embodiments, the system, network, method, and media described herein include log data or raw log data. In some embodiments, log data are generated by a computing system; non-limiting examples of computing systems include: email servers, web servers, ftp servers, gateway devices, routers, switches, desktop computers, tablets, phones, mobile phones, hotspots, printers, hard drives, data storages, security systems, access control systems, surveillance systems, or any system which can generate log data. The generated raw log data are unstructured text strings. A string of texts may contain various types of information; non-limiting examples include one or more IP addresses, timestamps, activities, activity types, resources accessed, user agents, access types, etc. In fact, the information contained in the raw log data is useful, but the unstructured log data prohibits system administrators to fully utilize the information contained therein. Therefore, the subject matter disclosed herein further transforms the raw log data into structured log data using one or more parser modules.

Parser Module

In some embodiments, the system, network, method, and media described herein include one or more parser modules. In some embodiments, a parser module receives raw log data from a computing device, such as email servers, web servers, ftp servers, gateway devices, routers, switches, desktop computers, tablets, phones, mobile phones, hotspots, printers, hard drives, and/or data storages. The parser module further transforms the raw log data into structured log data. In some embodiments, the transformation comprises processing the raw log data by a hash function, deriving one or more system event identifiers from one or more data fields of the raw log data. In some embodiments, the transformation further comprises generating the structured log data in a binary format.

The structured log data comprises the data fields (or called tokens in the programming language) extracted from the raw log data. The data fields are well organized in the structured log data, based on the use of various types of data structures. Non-limiting examples of the data fields include: timestamps, IP addresses, system events, activities, activity types, resources accessed, user agents, access types, device information, system information, hardware/software information of devices, etc.

Furthermore, the structured log data comprises information derived from the raw log data, or derived from the data fields extracted from the raw log data. The information derived includes one or more system event identifiers. In one embodiment, the system event identifiers comprise an alphanumeric representation of a system event. In another embodiment, system event identifiers comprise a checksum. Non-limiting examples of system events include a network event, an actionable network event, system failure, network failure, a user activity, a phishing activity, a spam, an advertisement, a fake message, a hack, an attack, an intrusion, a malicious activity, an unnatural activity, a virus, etc.

System Event Identifier

In some embodiments, the system, network, method, and media described herein include one or more system event identifiers. A system event identifier is a numeric, an alphabetic, or an alphanumeric representation of one or more system events. A system event identifier is derived from processing the raw log data. An event and an activity are used interchangeably in this disclosure.

In some embodiments, an activity takes place a number of times during a time window, where the time window is predefined or adaptively determined by the system. The repeated activities may be normal (e.g., a high-frequency trader places 1000 trades within a second) or abnormal (e.g., a hacker attempts 600 times to break a network firewall to steal customer credit card information stored in an online store). The parser module identifies the repetitions of the same activity, and assigns same system event identifiers to the same activities.

Once a system event identifier is derived, it is stored in data storage, such as volatile memory device or non-volatile data storage device. In some embodiments, the identifier is stored in a volatile memory device; the identifier is pushed by a parser module to a storage module, or is pulled by a storage module from a parser module. In some embodiments, the identifier is stored in a non-volatile storage device; the identifier is retrieved by the storage module locally or remotely, alternatively, the identifier is transmitted from a parser module to a storage module via a communication mechanism.

In certain embodiments, the derivation of a system event identifier is contingent on a time window. As described in the previous paragraph, an activity may happen just one time, or few times, or a large number of times. The importance of the number of occurrences associated with a same activity depends on a time window. For example, a user logs into a system with 1000 times per year may not pose a serious problem; however, it is a red flag if the 1000 logons happen within 5 seconds. Therefore, the subject matter limits the derivation of a system event identifier within a time window. When identical activities take place in two different time windows, the activities are associated with two system event identifiers, each of which is related to one of the two time windows.

In some cases, when the same activities happening in different time windows are further associated with another factor or other factors (e.g., IP addresses, regions, resources accessed, etc.), the activities are all assigned same system event identifiers. For instance, identical spam emails are sent out thousands of times every morning 8 am-9 am; if a time window is defined as 1 hour, the spam emails sent out yesterday and today would be mapped with two different identifiers. Nevertheless, when analysis further recognizes the spam emails were from the same sender, the subject system assigns all the spam events with same identifiers.

In some embodiments, the time window is predefined by a system itself or by a system administrator. In other embodiments, the time window is determined adaptively or dynamically by the system, based on an analysis or based on a rule set by a system administrator. During the time window, the structured log data comprising system event identifiers is accessed by a storage module. When a time lapses the time window, the system event identifiers are inaccessible by the storage module.

Storage Module

In some embodiments, the system, network, method, and media described herein include one or more storage modules. In some cases, a storage module utilizes a database service (e.g., MySQL) for storing the structured log data. In other cases, the storage module does not use a database service at all for storing the structured log data.

In the embodiments where the storage module does not use a database service, the storage modules are configured to perform one or more of the following steps: receive the structured log data; identify duplicated data entries in the structured log data, wherein the duplicated data entries are associated with a same system event identifier; create a representative of the duplicated data entries; count a number of occurrences in the duplicated data entries; retain timestamps of the duplicated data entries; generate a serialized data record and store the serialized data record into the one or more binary files, wherein the serialized data record comprises: the timestamps, the representative, and the number of the occurrences; and retrieve the serialized data record from the one or more binary files.

In some embodiments, identical activities take place a large number of times within a time window. The activities may be normal (e.g., a high-frequency trader places 1000 trades within a second) or abnormal (e.g., a hacker attempts 600 times to break a network firewall to steal customer credit card information stored in an online store). The repetition of an activity means that a large number of storage is occupied for recording the repeated activities in the raw log data and/or in the structured log data. In some cases, the large number of recordings themselves leads to system crash.

To avoid the data storage problems, the storage module deduplicates the data entries in the structured log data. In other words, the storage module searches duplicate data entries in the structured log data. The duplicate data entries are associated with the same system event identifiers. As such, to store the structured log data with less storage spaces, the storage module makes a single representative of the duplicated data entries, and stores only the representative without having to store all the duplicate data entries. On the other hand, although a same activity repeats a number of times, each of the repetitions is associated with one or more different determinants, such as timestamps, users, senders, receivers, resources accessed, activity sources, IP addresses, etc. Therefore, the storage module further retains and stores one or more of the different determinants. In further embodiments, the storage module generates one or more summaries of the duplicate data entries. Non-limiting examples of the summary include: the number/list of occurrences in the duplicated data entries; the number/list of sources of the repeated activities; the duration of the repeated activities; the number/list of senders; the number/list of receivers; the number/list of accessed resources; the number/list of device types; and any information associated with the repeated activities.

Binary Format

In some embodiments, the data entries of structured log data are stored in a binary format, or in a binary file. In addition, the storage module stores the deduplicated data entries, determinants, and summaries as data records in binary files. Storing in binary format or binary files (opposed to text strings or SQL database entries) can significantly save the storage space. In addition, the data records are serialized in order to further efficiently use the data storage.

The numbers of bytes occupied by data fields are determined in a systematic manner. For instance, a timestamp occupies 1 byte, or 2 bytes, or 3 bytes, or 4 bytes, or 5 bytes, or 6 bytes, or 7 bytes, or 8 bytes, or 9 bytes, or 10 bytes, or more than 10 bytes, or more than 15 bytes, or more than 20 bytes, or more than 30 bytes, or more than 40 bytes, or more than 50 bytes. A virtual offset comprises 1 byte, or 2 bytes, or 3 bytes, or 4 bytes, or 5 bytes, or 6 bytes, or 7 bytes, or 8 bytes, or 9 bytes, or 10 bytes, or more than 10 bytes, or more than 15 bytes, or more than 20 bytes, or more than 30 bytes, or more than 40 bytes, or more than 50 bytes. A binary file identifier takes 1 byte, or 2 bytes, or 3 bytes, or 4 bytes, or 5 bytes, or 6 bytes, or 7 bytes, or 8 bytes, or 9 bytes, or 10 bytes, or more than 10 bytes, or more than 15 bytes, or more than 20 bytes, or more than 30 bytes, or more than 40 bytes, or more than 50 bytes. A representative of repeated activities (or, of duplicate data entries in structured log data) uses 1 byte, or 2 bytes, or 3 bytes, or 4 bytes, or 5 bytes, or 6 bytes, or 7 bytes, or 8 bytes, or 9 bytes, or 10 bytes, or more than 10 bytes, or more than 15 bytes, or more than 20 bytes, or more than 30 bytes, or more than 40 bytes, or more than 50 bytes.

Note that depending on the type of computing systems, the number of bits in a byte may differ. Those with skill in the art can easily recognize the optimal allocation of the number of bytes for the data fields.

In some embodiments, the storage module further comprises an online analytical processing tool configured to aggregate a data field in the one or more binary files. Non-limiting examples of the data field includes: the timestamp(s), the number/list of occurrences of a host server, the number/list of occurrences of a program, the number/list of occurrences of a severity level, the number/list of occurrences of a system event, the list of a last active host server, a summary of system events within a time window, the number/list of occurrences in the duplicated data entries, the number/list of sources of the repeated activities, the duration of the repeated activities, the number/list of senders, the number/list of receivers, the number/list of accessed resources, the number/list of device types, and any information of interest.

Data Storage

In some embodiments, the system, network, method, and media described herein include one or more data storages, or the use of them. In certain embodiments, the one or more data storages comprise one or more types of storages, where the storages can be volatile or non-volatile. The storage is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In certain embodiments, the data storage is used by the parser module, or by the storage module, or by both the parser module and the storage module, or by any other modules included in the system described herein.

Mapping Module

In some embodiments, the system, network, method, and media described herein include a mapping module. The mapping module is configured to create, record, modify, or delete a map between the one or more system event identifiers and the storage module. In some embodiments, there are a plurality of parser modules and a plurality of storage modules. When a parser module generates structured log data, it is the turn of a storage module to analyze the structured log data. Recall that a task of storage modules is to deduplicate the data entries in the structured log data; i.e., the storage module will generate a single representative of duplicate data entries, which in some embodiments are determined as associated with the same system event identifiers. Therefore, the structured log data related to the same system event identifiers are designated to the same storage module. Otherwise, the designation of the structured log data to two distinct storage modules will waste the storage space and computational power.

Detection Module

In some embodiments, the system, network, method, and media described herein include a detection module. The detection module is configured to detect a system event/activity from the structured log data, or from the one or more binary files, or from both of the aforementioned. Non-limiting examples of the system event/activity include: a user activity, a phishing activity, a spam, an advertisement, a fake message, a hack, an attack, an intrusion, a malicious activity, an unnatural activity, a virus, a network event, an actionable network event, and any event/activity of a system administrator's interest. Those with skill in the art can easily recognize any system event/activity.

When a system event/activity is detected, the detection module generates an alert. Alternatively, a system event/activity is detected and one or more alert criteria are met, an alert is generated.

Query Module

In some embodiments, the system, network, method, and media described herein include a query module. The query module is configured to interact with a user (e.g., a system administrator) to enter, adjust or retrieve one or more data parameters. In one embodiment, the one or more data parameters comprise one or more tokens extracted from the raw log data. Non-limiting examples of the one or more data parameters include: the timestamp(s), the number/list of occurrences of a host server, the number/list of occurrences of a program, the number/list of occurrences of a severity level, the number/list of occurrences of a system event, the list of a last active host server, a summary of system events within a time window, the number/list of occurrences in the duplicated data entries, the number/list of sources of the repeated activities, the duration of the repeated activities, the number/list of senders, the number/list of receivers, the number/list of accessed resources, the number/list of device types, a time period for the storage module receiving the structured log data, and any information of the user's interest.

Full Text Search Indexer

In some embodiments, the system, network, method, and media described herein include a full text search indexer. The full text search indexer is configured to index the serialized data records stored in the binary files, and allow searching or filtering on the serialized data records. In certain embodiments, the full text search indexer comprises an index list. In some implementations, the configuration of the index list is automatic or dynamic.

Manager Module

In some embodiments, the system, network, method, and media described herein include a manager module. The manager module is configured to distributively configure the parser module, or the storage module, or both of them. In additional embodiments, the manager module further comprises a user interface, the interface allowing a user to enter or modify one or more configuration parameters for the parser module or the storage module, and/or to receive one or more existing configuration parameters of the parser module or the storage module.

In some embodiments, the manager module configures the parser/storage module on a regular basis. Sometimes, the manager module configures the parser/storage module on an irregular basis. In some embodiments, the manager module configures the parser/storage module by transmitting one or more configuration parameters to the parser/storage module. In some embodiments, the manager module configures the parser/storage module in an active mode, while the parser/storage module is being configured in a passive mode. In some embodiments, the manager module itself comprises a data storage storing one or more configuration parameters of the parser/storage module.

In some embodiments, the system, network, method, and media described herein include more than one parser module, or more than one storage module. Therefore, the manager module further comprises a networking map of the parser module(s) and/or the storage module(s). The network map comprises a geographic location and/or an IP address.

System Architecture

In some embodiments, all of the modules described herein are installed on a same digital processing device. In some embodiments, every module described herein is installed on a distinct digital processing device. In some embodiments, two of the modules described herein are installed on a same digital processing device. In some embodiments, three of the modules described herein are installed on a same digital processing device. In some embodiments, four of the modules described herein are installed on a same digital processing device. In some embodiments, five of the modules described herein are installed on a same digital processing device.

In some embodiments, a module described herein is installed on more than one distinct digital processing device.

In some embodiments, the subject system described herein is highly scalable. In some embodiments, the system comprises 65,000 or more storage modules.

In some embodiments, storage modules are deployed across multiple hardware (bare metal, virtual, or mixed). In some embodiments, storage modules are deployed in a server.

Multiple storage modules can be deployed and still only have a single API.

System Event Management

The modern age of cloud computing boosts a large number activities on the Internet, leading to tremendous recordings in raw log data. Storing huge sized raw log data becomes a formidable task, slowing down computational speed and wasting computational resources. In addition to the aforementioned deduplication technology, exploitation of knowledge of well-known events can facilitate log data analysis and management. For example, a computer worm has been well investigated and a method to block the worm is known. When the worm reaches a system, the system can automatically or manually invoke the antivirus program to block or kill the worm.

In some embodiments, an event filtering mechanism is applied when the system receives unstructured, raw log data. In some embodiments, the event filtering mechanism is applied when the structured log data is generated. Alternatively, the event filtering mechanism is applied when the deduplicated log data is generated. The filtering mechanism relies on a database of known events. The database can be based on SQL technology, or based on storing known events in a binary file as deduplication did.

The filtering begins with determining if an event has been seen. In case the event was unknown, the event was presented to a system administrator for further evaluation. The human evaluation determined what action should be acted when such an event occurs, and the knowledge was further stored in the database. In case the event was known, the following question was explored: "if the event is an actionable event?" If not actionable, the event was kept for further analysis. If actionable, the system automatically performed an action associated with the event, or requested a system administrator perform an action.

In some embodiments, the event filtering in conjunction with log data deduplication amplifies the capacity of the deduplication system. Some events can be handled automatically by the system. Some trivial events will not be presented to system administrators. In particular, when fewer non-critical events are seen by the system administrator, they can address the events that indeed require their attentions.

Highly Scalable System

In some embodiments, the system, network, method, and media described are highly scalable. There are one or more parser modules, or a plurality of storage modules in the embodiments. The one or more parser modules are configured to receive raw log data, transform the raw log data into structured log data, and transmit the structured log data to a plurality of storage modules, wherein data entries of the structured log data associated with a same system event are transmitted to a same storage module. In certain embodiments, the plurality of storage modules do not utilize a database service for storing processed log data. The storage modules are configured to: receive the structured log data from the one or more parser modules; identify duplicated data entries in the structured log data; generate a representative of the duplicated data entries; generate a serialized data record, the serialized data record comprising timestamps of the duplicated data entries and the representative of the duplicated data entries; and store the serialized data record in a binary file.

In some embodiments, the storage modules are distributed to one or more servers. In various embodiments, the total number of storage modules distributed is, for example, more than 1, or more than 10, or more than 100, or more than 1000, or more than 10000, or more than 100000, or more than 1000000. In various embodiments, the total number of servers is, for example, more than 1, or more than 10, or more than 100, or more than 1000, or more than 10000, or more than 100000, or more than 1000000. A server can host one or more storage modules.

In some embodiments, only a single user interface platform is required to allow a user to configure the parser modules and/or the storage modules, even though the number of storage modules is very large or the number of hosting servers is very large.

Digital Processing Device

In some embodiments, the system, network, method, and media described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-transitory Computer Readable Storage Medium

In some embodiments, the system, network, method, and media disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the system, network, method, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), PHP Hypertext Preprocessor (PHP), Python™, Ruby, Tool Command Language (Tcl), Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the system, network, method, and media disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

EXAMPLES

The following illustrative examples are representative of embodiments of the software applications, systems, and methods described herein and are not meant to be limiting in any way. While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Example 1

System Design

FIG. 1 illustrates an example of a system design. In this example, the parser module received network/system event which were recorded in unstructured, raw log data. The parser module pulled the raw log data and assigned multiple workers to transform the raw log data into structured log data, where was pushed to the storage module. The storage module pulled the structured log data, where the deduplicator identified duplicated data entries in the structured log data and removed replicate data entries. Finally, the deduplicated data was stored into one or more binary files in data storage, which was linked with a full text searching (FTS) backend. On the other hand, the configuration module passed configuration parameters to the storage module for setting up (or updating) the optimal configuration of the storage module.

The system decoupled the core process/analysis modules from the front user interfaces by including one or more application programming interfaces (APIs). Referring to FIG. 1, there was an API in the storage module. This API allowed a user or another computer program to access the information stored in the storage module or to configure the storage module. Furthermore, there was an aggregating API, which can integrate various pieces of data stored in different storage modules. In the configuration module, it contains a configuration API to communicate with the storage API for parameters passage. The benefit of API design was to allow a third party to create its own software application.

The subject matter implemented in this example produced an unexpected, promising result. The system was able to process approximately 1 million events per second, which was a 66-fold increase in scalability compared with a benchmark system. Similarly, the ingestion, indexing and search of system events/activities were made at unrivaled speeds. Another benefit of the system in this example was the capability of handling enormous amounts of unstructured raw log data. The deduplication technique significantly reduced space for log storage, and in turn enabled the system to store more log data.

The stored log data was no more a mess; it was in a well-organized format allowing a system administrator to not only monitor what had happened in the system but also manage an optimal configuration/allocation of computing resources. Important events hidden in the raw log data usually are a small portion, which is difficult for system administrator to monitor and manage. Through the effective management in this example, the Example 2

Event Filtering and Management

In the modern age of computing systems, a large number activities taking place in a system are recorded in raw log data. Storing the raw log data becomes a formidable task, which slows down computational speed and wastes computational resources. The subject matter described herein can solve the problems, as shown in the example described in FIG. 1. Nevertheless, there have been a number of events well known to system administrators; the knowledge can be organized in a knowledgebase or data store, which is further exploited to management events.

Figure 2:
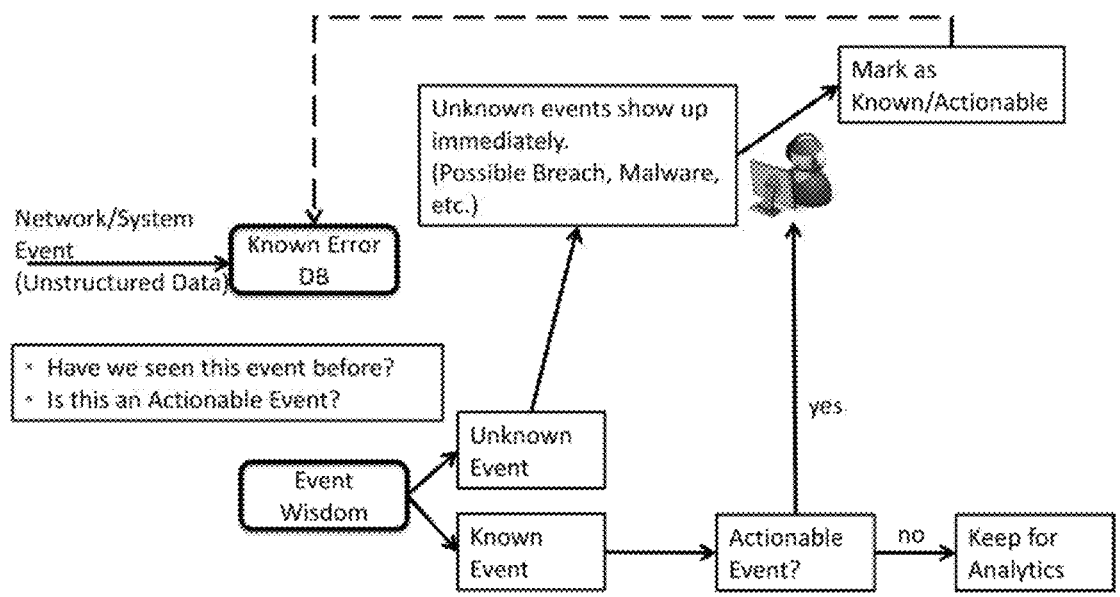
FIG. 2 illustrates an example workflow of event filtering; in this case, the system invoked a database of known events to determine what actions should be performed.

FIG. 2 illustrates an example workflow of event filtering. When the system received unstructured raw log data (or deduplicated log data in another embodiment), a database of known events was invoked. The major task at this step was to determine "if an event has been seen?" If the event was unknown, it was presented to a system administrator for further evaluation. The human evaluation determined what action should be acted when such an event occurs, and the knowledge was further stored in the database.

If the event was known, the following question was: "if the event is an actionable event?" If not actionable, the event was kept for further analysis. If actionable, the system automatically performed an action associated with the event, or requested a system administrator perform an action.

The event filtering based on existing knowledge assisted system administrator to efficiently manage events. Moreover, the event filtering in conjunction with log data deduplication would augment the capability of the whole system. In particular, fewer non-critical events would be seen by the system operations personnel, allowing them to address only the events that need attention.

Example 3

User Interfaces

Figure 3:
FIG. 3 illustrates an example of a user interface; in this case, the user interface presented an overview of the system, including user definable multiple dashboards with different set of portlets.
Figure 4:
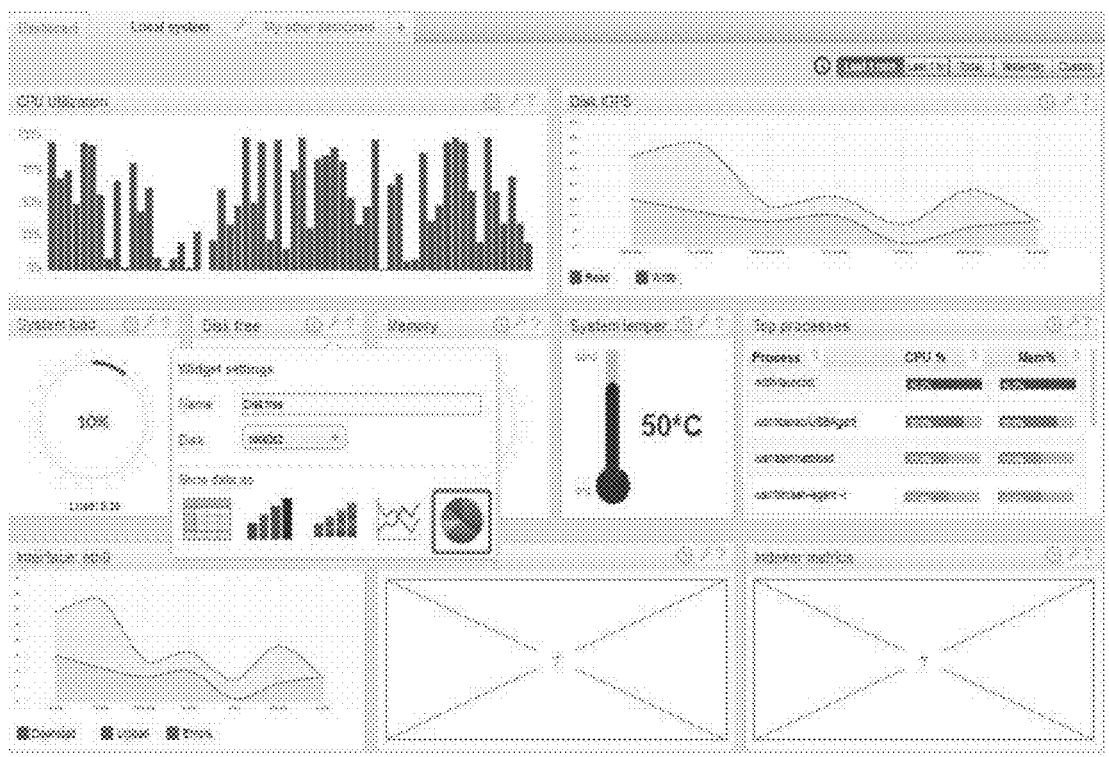
FIG. 4 illustrates an example of a user interface; in this case, the interface presented a summary of computing resources (such as CPU, hard drives, and memory devices) used for log data analysis and deduplication.
Figure 5:
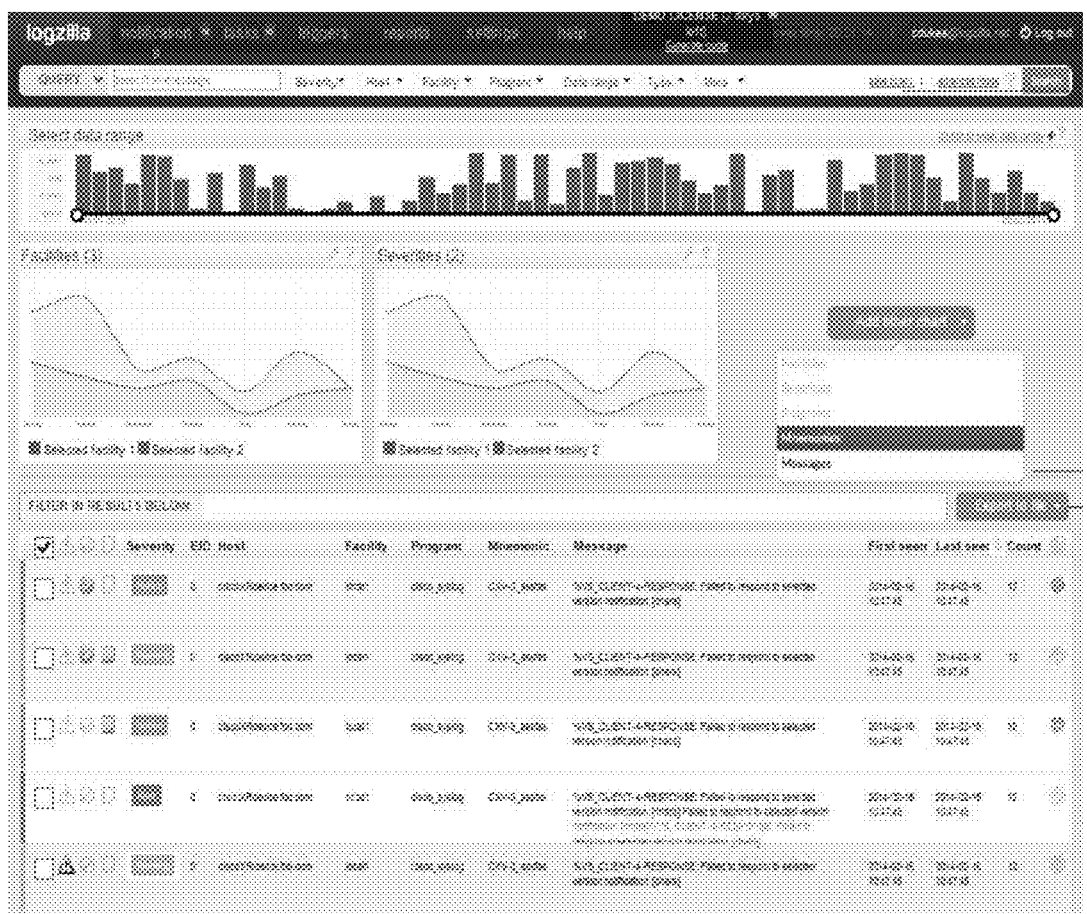
FIG. 5 illustrates an example of a user interface; in this case, the interface presented detailed log data information.

FIG. 3 to FIG. 5 illustrate an example of a user interface. The user interface presented an overview of the system, with user definable multiple dashboards comprising different set of portlets. Each portlet was customizable and could be arranged to the user's liking. Time based charts could zoom into smaller time windows, e.g., months, weeks, days, hours, minutes, and/or seconds. When seconds were selected, the graph turned into a "live" chart showing incoming event summaries.

The system comprised various components, e.g., facilities, host servers, and programs. The user could interact with the dashboard to view a status or a summary of the system components. Furthermore, the system analyzed the raw log data and performed deduplication, and a user can view the summary of the deduplication, e.g., number of events, the time series of the received events, servers associated with deduplication, IP/MAC addresses associated with the events, browsers associated with the events, and alerts.

Referring to FIG. 4, the interface presented a summary of computing resources (such as CPU, hard drives, and memory devices) used for log data processing. The summary could be a snapshot or a time series. In addition, the hardware conditions (e.g., temperature, system load) were displayed.

FIG. 5 presents an example of detailed log data information. Once the parser modules and storage modules finished removing duplicate data entries and storing them into binary files, the log data information could be retrieved by a full text search tool. Using the retrieval tool, the system events were summarized, e.g., in terms of severity over time. Furthermore, a list of system events was displayed for the system administrator to monitor the system status.

Example 4

Detection and Alert

Figure 6:
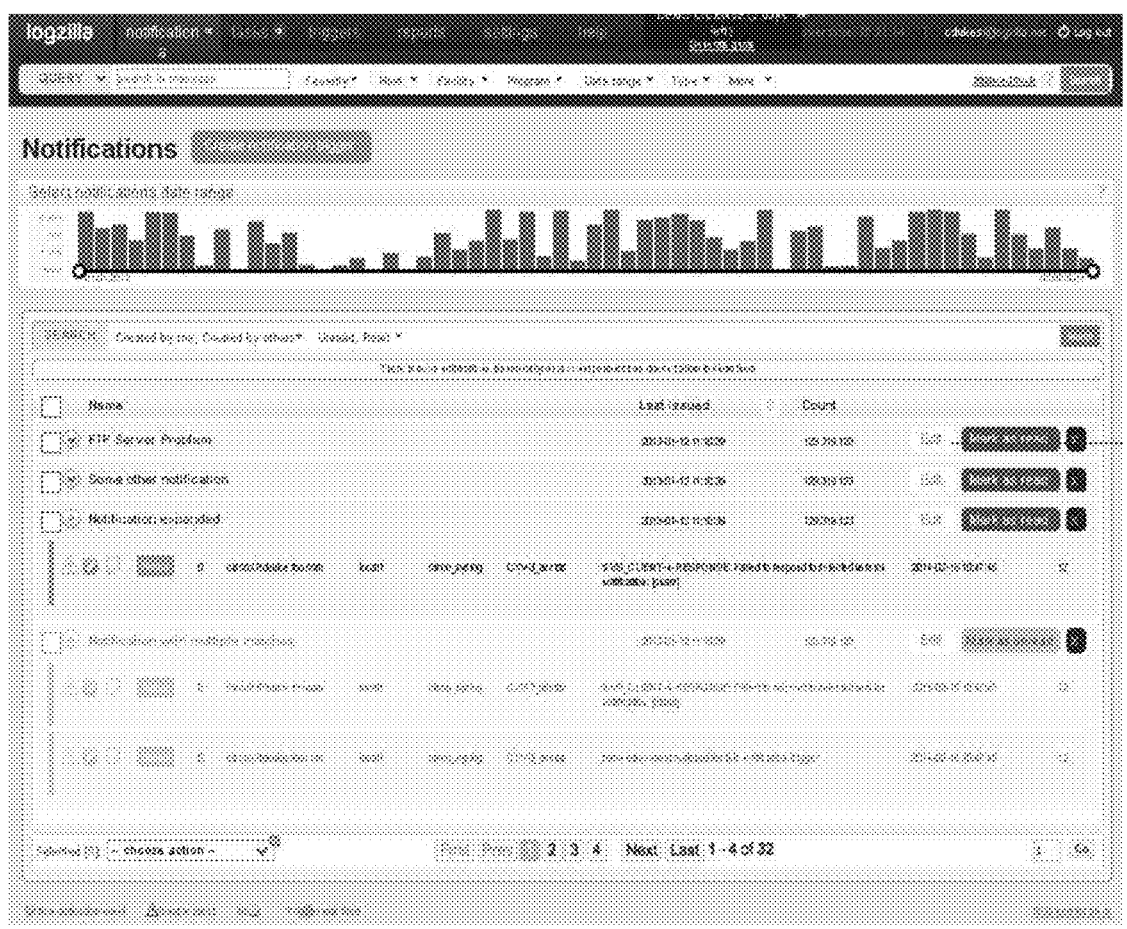
FIG. 6 illustrates an example of detection and alert results; in this case, a notable event was detected.
Figure 7:
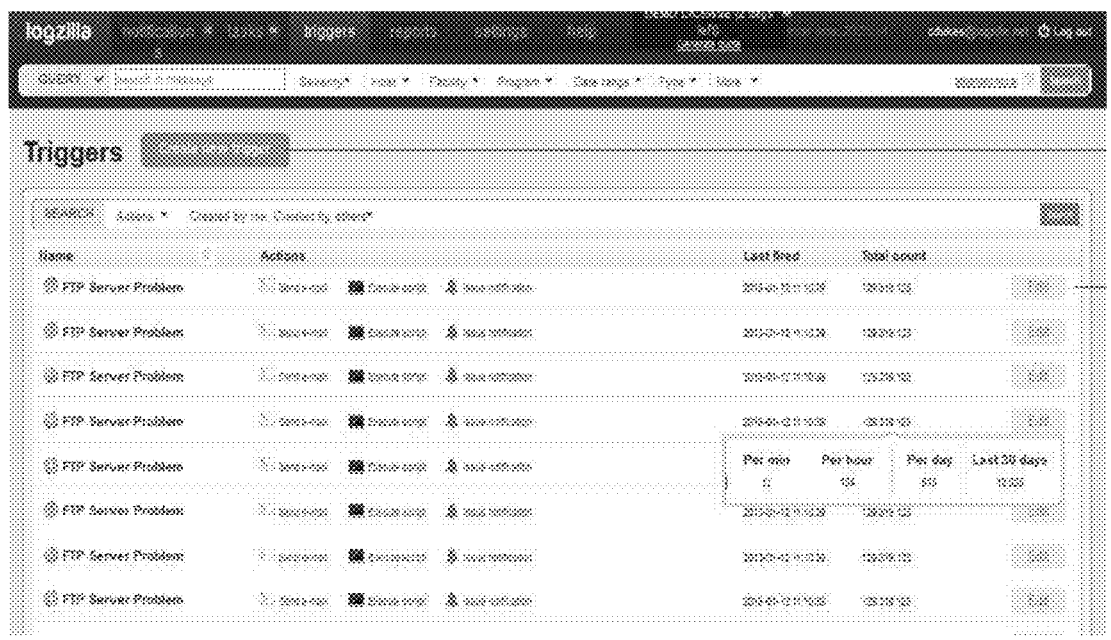
FIG. 7 illustrates an example of detection and alert results; in this case, the system event was further reported its duplicate occurrences during various time windows.
Figure 8:
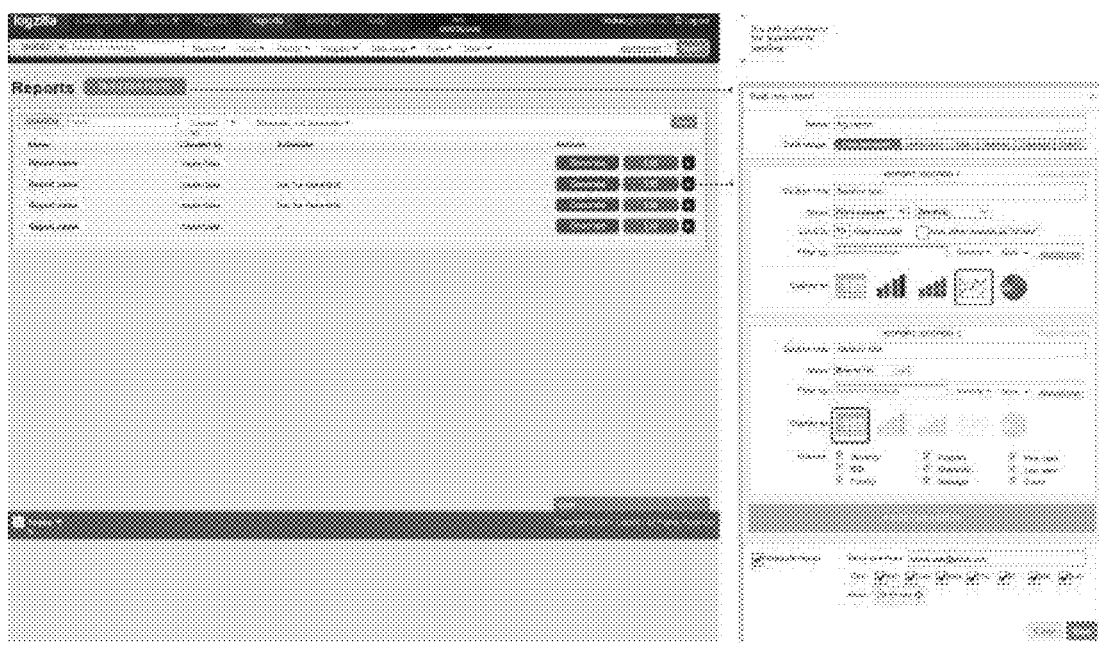
FIG. 8 illustrates an example of detection and alert results; in this case, a customizable report was generated regarding the detected event and additional information (graphs, times, severity, devices, sources, time windows, etc.) was added to the report.
Figure 9:
FIG. 9 illustrates an example of using knowledge database for event management; in this case, an administrator invoked the knowledge database to explore what the event was about and how to address the event.

FIG. 6 to FIG. 9 illustrate an example of detection results and alert results. Referring to FIG. 6, when a notable event was detected, the system listed it in the user interface. Through this notification, the system administrator was able to quickly learn the events. In FIG. 7, the system event was further reported its duplicate occurrences during various time windows. The system administrator could further set up the alert rule regarding this event. In FIG. 8, a customizable report (e.g., scheduled, instant) was generated regarding the event. In addition, more information (graphs, times, severity, devices, sources, time windows, etc.) associated with the event could be added the report. Referring to FIG. 9, the interface further allowed an administrator to invoke the knowledge database to explore what the event is about, and how to address the event. For instance, a network error message could be linked to a Cisco® knowledgebase for the system administrator to look up.

Example 5

System Configuration

Figure 10:
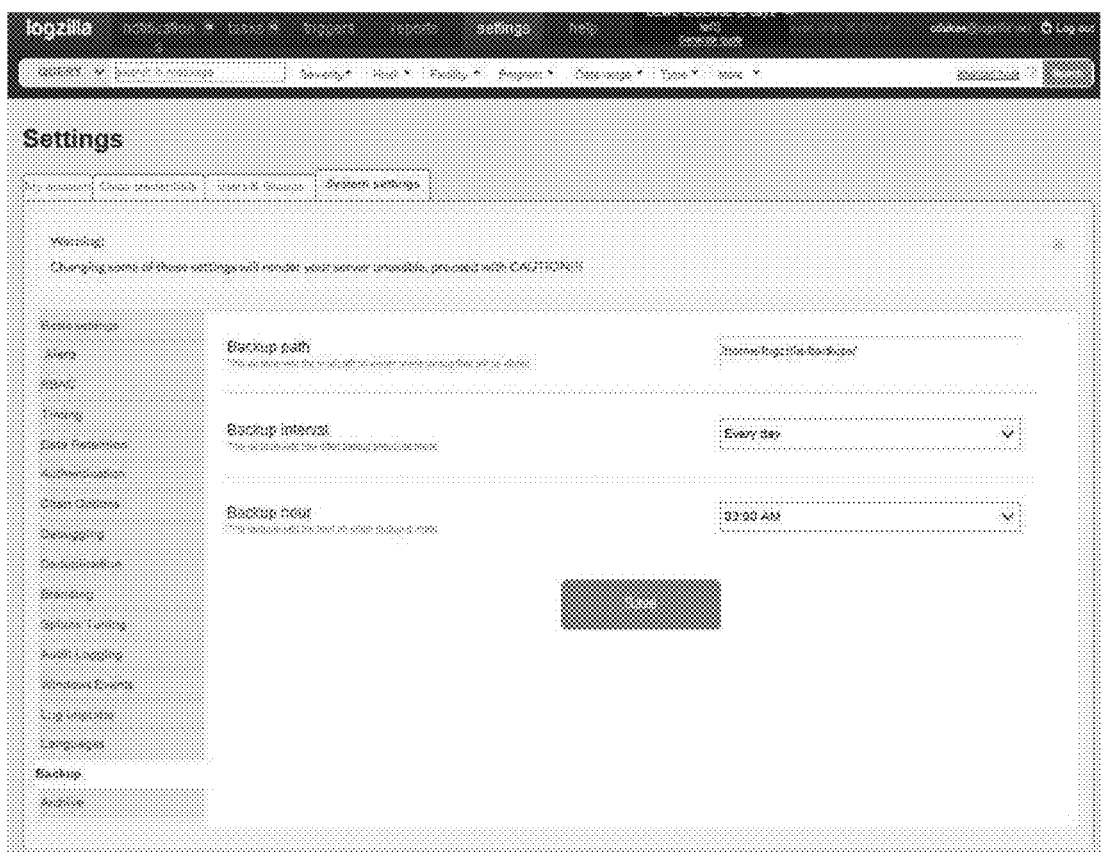
FIG. 10 illustrates an example of system configuration; in this case, a system administrator configured the setting of backups and times reports.
Figure 11:
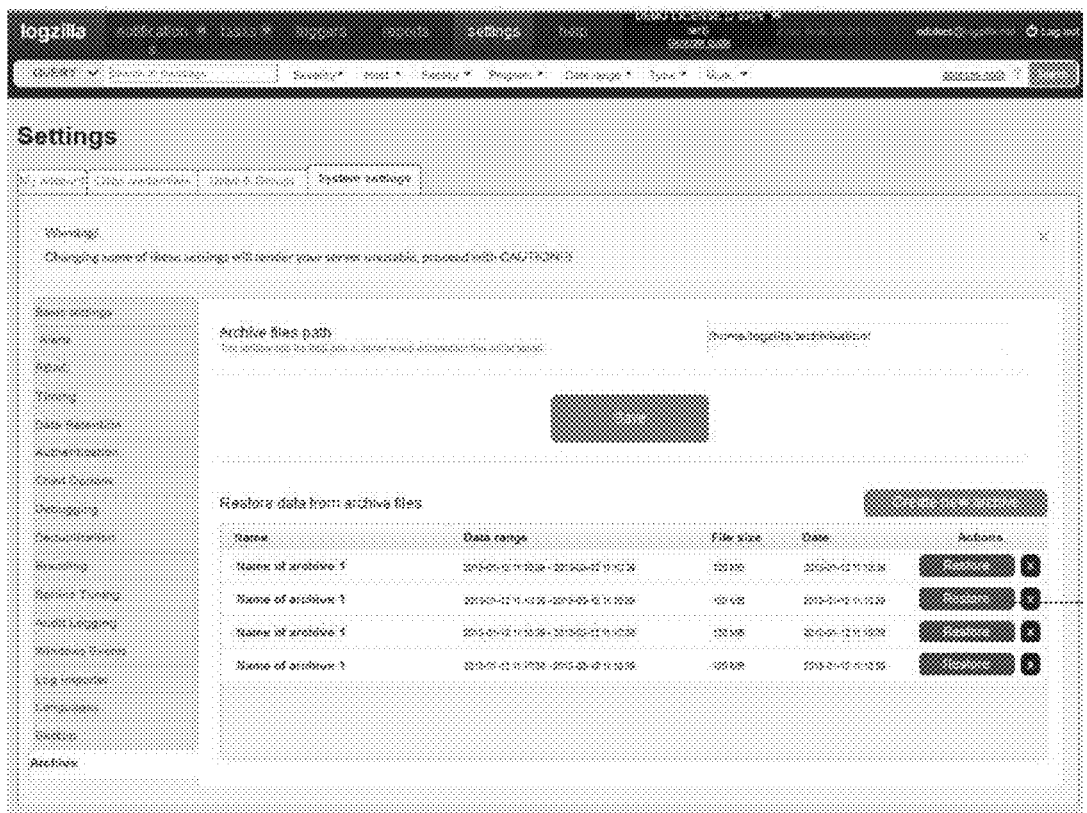
FIG. 11 illustrates an example of system configuration; in this case, a system administrator configured the setting of reports.

FIG. 10 and FIG. 11 illustrate an example of system configuration. A system administrator can configure backups, times, reports. Furthermore, a data record in deduplicated log data can be linked to a map to display geographical information and IP information. In a setting, the system can trace the routes of an event over time or over routing addresses. Finally, notifications associated with an event can be set up.

What is claimed is:

1. A computing platform for analyzing and de-duplicating system log, the platform comprising:
   (a) two or more servers, wherein each server comprises a digital processor, a memory module and an operating system configured to perform executable instructions;
   (b) computer readable media storing instructions executed by at least one of the two or more servers to provide an application, the application comprising:
      (1) a user interface allowing a user to configure one or more parser modules or a plurality of storage modules, wherein the plurality of storage modules are distributed to the two or more servers;
      (2) the one or more parser modules configured to:
         (i) receive raw system log data automatically generated by a system, wherein the raw system log data comprises system events logged in a plain text format;
         (ii) parse and transform the raw system log data into structured system log data by a hash function, wherein the structured system log data comprises the system events organized in a defined data format; and
         (iii) transmit the structured system log data to the plurality of storage modules, wherein data entries of the structured system log data associated with a same system event and happening within a first defined time window are transmitted to a same storage module; and
      (3) the plurality of storage modules without a database service, the storage modules configured to:
         (i) receive the structured system log data from the one or more parser modules;
         (ii) identify duplicated data entries in the structured system log data, wherein the duplicated data entries are happening within a second defined time window and comprise distinct timestamps and identical system events;
         (iii) generate a representative system event of the duplicated data entries; and
         (iv) generate and store a serialized data record in a binary format, the serialized data record comprising the distinct timestamps of the duplicated data entries and the representative system event of the duplicated data entries.

2. The platform of claim 1, wherein a number of the plurality of storage modules is more than 10.

3. The platform of claim 1, wherein a number of the plurality of storage modules is more than 100.

4. The platform of claim 1, wherein a number of the plurality of storage modules is more than 1000.

5. The platform of claim 1, wherein a number of the plurality of storage modules is more than 10000.

6. A method, implemented by two or more servers, for analyzing system log and de-duplicating the system log, the method comprising:
   (a) creating, by at least one of the two or more servers, a user interface allowing a user to configure one or more parser modules or a plurality of storage modules, wherein the plurality of storage modules are distributed to the two or more servers;
   (b) configuring, by at least one of the two or more servers, the one or more parser modules to:
      (1) receive raw system log data automatically generated by a system, wherein the raw system log data comprises system events logged in a plain text format;
      (2) parse and transform the raw system log data into structured system log data by a hash function, wherein the structured system log data comprises the system events organized in a defined data format; and
      (3) transmit the structured system log data to the plurality of storage modules, wherein data entries of the structured system log data associated with a same system event and happening within a first defined time window are transmitted to a same storage module; and
   (c) configuring, by the two or more servers without using a database service, the plurality of storage modules to:
      (1) receive the structured system log data from the one or more parser modules;
      (2) identify duplicated data entries in the structured system log data, wherein the duplicated data entries are happening within a second defined time window and comprise distinct timestamps and identical system events;

(3) generate a representative system event of the duplicated data entries; and
(4) generate and store a serialized data record in a binary format, the serialized data record comprising the distinct timestamps of the duplicated data entries and the representative system event of the duplicated data entries.

7. The method of claim 6, wherein a number of the plurality of storage modules is more than 10.

8. The method of claim 6, wherein a number of the plurality of storage modules is more than 100.

9. The method of claim 6, wherein a number of the plurality of storage modules is more than 1000.

10. The method of claim 6, wherein a number of the plurality of storage modules is more than 10000.

* * * * *